United States Patent Office 2,926,068
Patented Feb. 23, 1960

2,926,068
METHOD FOR THE PREPARATION OF PLUTONIUM HALIDES AND OXYHALIDES

Norman R. Davidson, Sierra Madre, Calif., and Joseph J. Katz, Chicago, Ill., assignors to the United States of America as represented by the United States Atomic Energy Commission No Drawing. Application June 9, 1947
Serial No. 753,567

13 Claims. (Cl. 23—14.5)

This invention relates to a process for making plutonium halides, $PuX_3$, plutonium oxyhalides, PuOX, and mixtures thereof, where Pu denotes the element plutonium and X denotes any one of the elements belonging to the halogen group.

An object of this invention is to provide a suitable method for the preparation of plutonium halide and plutonium oxyhalide and mixtures thereof, and more particularly a method for the preparation of plutonium trihalides and plutonium oxyhalides and mixtures thereof.

The products formed by the process comprising this invention are useful in the production of the pure plutonium metal.

In accordance with the process of this invention, plutonium dioxide and a halide in the presence of a reducing agent react to produce a mixture of plutonium trihalide and plutonium oxyhalide. In accordance with one embodiment of this process the plutonium compounds in the presence of a reducing agent react with a halide in the form of the gaseous hydrogen halide selected from one of the following: HF, HCl, HBr, and HI to form a mixture of the plutonium halide and the plutonium oxyhalide. This reaction may also be carried out in aqueous media as well as in the dry state, and halides other than hydrogen halides are reactive in this process. However, when a halide having strong reducing properties (for example the bromide or iodide) is employed in the reaction, the reduction of the oxide or other compound of plutonium may be effected in the absence of any supplemental reducing agent. Nevertheless, we prefer to use hydrogen together with the halide in order to insure easier and more complete reduction of the plutonium to the trifluoride and oxyfluoride. In fact, in the reaction with hydrogen chloride and hydrogen fluoride the presence of hydrogen or other reducing agent is necessary. Suitable reducing agents other than hydrogen comprise, for example, ammonium iodide and ammonium bromide which are particularly suitable for reactions carried out in aqueous media.

In the method comprising the subject matter of this invention, the reaction takes place in accordance with the following representation:

(1)  $PuO_2 + 3HX + \frac{1}{2}H_2 \rightleftharpoons PuX_3 + 2H_2O \rightleftharpoons$ (2)  $PuX_3 + H_2O \rightleftharpoons PuOX + 2HX$ in which X is defined above.

The above reaction takes place in accordance with the principles of the law of mass action as set forth by Guldberg and Waage. In view of the concept just mentioned, it is readily apparent that in the above reaction the relative proportions of the plutonium trihalide and plutonium oxyhalide in the mixture formed by such a reaction may be influenced by utilizing appropriate mixtures of hydrogen halide, hydrogen and water in the system.

In some cases, for example, in that of the iodide, the action proceeds at a rate such that the reactions set forth in Equations 1 and 2 occur substantially simultaneously.

All of the above reactions are reversible and it can be seen that removal of the water as formed in Reaction 1 favors the formation of the trihalide in preference to the formation of the oxyhalide. Also, the presence of the excess hydrogen halide in the system tends to reconvert the oxyhalide to the trihalide as represented in the reverse of Reaction 2. Thus, in the presence of water and hydrogen halide a mixture of plutonium oxyhalide and plutonium trihalide is obtained. By isolating the trihalide and hydrolyzing this compound and removing the hydrogen halide as formed, the trihalide is converted quantitatively to the oxyhalide. The latter reaction is carried out preferably at a temperature substantially above normal room temperature.

The reactions set forth in Equations 1 and 2 take place at a temperature substantially above normal room temperature, but the reaction is preferably carried out between 300° C. and 1000° C. The duration of the reaction period is preferably of the order of from two to eight hours; the longer reaction periods and higher temperatures are usually necessary for the dry preparations, e.g., the powdered oxide reacted with a gaseous hydrogen-hydrogen halide mixture in contrast to the "wet" preparation such as solutions of a tetravalent plutonium compound treated with gaseous hydrogen halide in the presence of a reducing agent, or with hydrogen halide-hydrogen mixtures.

The following tables summarize equilibria data for the formation of oxyhalides and trihalides by hydrohalogenation of plutonium compounds.

TABLE I
*Equilibrium pressures and constants in the PuOCl, $PuCl_3$ equilibrium*

| T, °K. | $P_{HCl}$, mm. | $P_{H_2O}$, mm. | K (atm.⁻¹) |
|---|---|---|---|
| 969 | 385.0 | 1.418 | 0.00726 |
| 967 | 538.5 | 4.060 | .0106 |
| 967 | 538.0 | 3.780 | .00991 |
| 911 | 237.9 | 1.102 | .0148 |
| 911 | 243.5 | 1.458 | .0187 |
| 917 | 224.5 | 1.142 | .0172 |
| 909 | 169.2 | 0.627 | .0165 |
| 907 | 253.5 | 1.460 | .0172 |
| 862 | 161.8 | 1.188 | .0345 |
| 871 | 165.8 | 1.227 | .0339 |
| 814 | 136.1 | 1.540 | .0632 |
| 816 | 119.5 | 1.350 | .0716 |

The free energy equation for the reaction:

$$PuOCl + 2HCl \rightarrow PuCl_3 + H_2O$$

is calculated to be:

$$\Delta F_{(kcal.)} = -20.8 + 30.9T/1000$$

and the entropy of the reaction is expressed as:

$$\Delta S(e.u.) = -30.9 \pm 0.8$$

TABLE II
*Equilibrium pressures and constants in the PuOBr, $PuBr_3$ equilibrium*

| T, °K. | $P_{HBr}$ (mm. Hg) | $P_{H_2O}$ (mm. Hg) | K |
|---|---|---|---|
| 911 | 179.1 | 0.645 | 0.0153 |
| 914 | 188.5 | 0.731 | .0156 |
| 919 | 197.5 | 0.766 | .0149 |
| 882 | 110.8 | 0.396 | .0246 |
| 875 | 217.0 | 1.532 | .0247 |
| 883 | 176.0 | 0.991 | .0243 |
| 815 | 116.1 | 1.250 | .0704 |
| 816 | 88.2 | 0.706 | .0692 |

A straight line was derived by a least-squares treatnent of the above data and corresponds to the free energy equation:

$$\Delta F_{(kcal.)} = -(22.8 \pm 0.4) + (33.2 \pm 0.4)T/1000$$

for the reaction:

$$PuOBr + 2HBr \rightarrow PuBr_3 + H_2O$$

TABLE III

Halogenation of plutonium compounds

| Starting Material | Reaction Time, Hours | Temp., °C. | $P_{H_2O}$, mm. | $P_{HCl}$, mm. | $P_{H_2}$, mm. | Product |
|---|---|---|---|---|---|---|
| $PuO_2.XH_2O$ | 4 | 675 | 4 | 570 | 190 | $PuCl_3$ |
| $PuCl_3.6H_2O$ | 4 | 650 | 0.2 | 640 | 120 | PuOCl |
| PuOCl | 4 | 650 | 0.2 | 640 | 120 | PuOCl |
| $PuCl_3.6H_2O$ | | | 7.3 | 85 | 680 | PuOCl |
| | | | | HBr. | | |
| $PuO_2.XH_2O$ | 4 | 800 | 1.9 | 27 | 700 | PuOBr |
| Do | 6 | 750 | 0.1 | 760 | | $PuBr_3$ |
| Do | 7 | 750 | 0.1 | 400 | | PuOBr |
| Do | 6 | 750 | 0.38 | 117 | | PuOBr |
| $PuBr_3$(soln.) | 6 | 350 | | 15 | | PuOBr |
| $PuO_2$ | | 800 | | $PuBr_3$ 5 | | PuOBr |
| $PuO_2$ | | 800 | 22 | | 700 | $PuBr_3$ |

The tribromide and trichloride of plutonium are both deliquescent and readily take up water vapor to form the hexahydrate $PuBr_3.6H_2O$ and $PuCl_3.6H_2O$ both of which readily hydrolyze to form their respective oxyhalide (PuOBr and PuOCl) in the absence of any extraneous hydrogen or hydrogen halide. In fact, dehydration of the hydrated trihalides is carried out with difficulty since under the conditions necessary for dehydration the trihalides tend to form the oxyhalide. The hexahydrate of $PuCl_3$ or $PuBr_3$ forms PuOCl or PuOBr even when heated in vacuo at 400°–600° C. in a quartz reaction tube. The anhydrous trihalides of plutonium hydrolyze in the presence of stoichiometric amounts of water at elevated temperatures.

EXAMPLE I

PuOCl and $PuCl_3$

Anhydrous $PuCl_3$ was placed in a quartz reaction vessel which was evacuated and water vapor was admitted from a tube kept at 0° C. The hydration of the $PuCl_3$ was carried out over night. The following morning the quartz reaction tube was immersed in liquid nitrogen for evacuation. When evacuation was completed, the tube was heated to 400° for four hours and then to 520° for one-half hour. While still warm the side arm of the quartz reaction tube was immersed in liquid nitrogen to condense the HCl and $H_2O$ for removal from the product which was identified by X-ray analysis to be 65% PuOCl and 35% $PuO_2$. The formation of the oxide was attributed to the use of excessive heat in the presence of water vapor whereby $PuO_2$, HCl and hydrogen are obtained.

The above product mixture of PuOCl and $PuO_2$ was converted completely to PuOCl by heating for three hours at 675° C. after the introduction of 55 mm. of HCl and 95 mm. $H_2$ to the reaction tube. An excess of hydrogen was used in the conversion of the $PuO_2$ to PuOCl in order to insure complete reduction. The amount of HCl and $H_2$ necessary for the reduction was calculated from the equation:

$$PuO_2 + 3HCl + \tfrac{1}{2}H_2 \rightarrow PuCl_3 + 2H_2O$$

Plutonium oxychloride is green or blue-green, insoluble in water and soluble in dilute acid solutions. X-ray diffraction study of PuOCl shows that the crystal form is tetragonal having two molecules per unit cell. The $a_1$ axis is 4.00 A., the $a_3$ axis 6.78 A. from which data the density, 8.81, has been calculated. The foregoing X-ray crystallographic data shows that PuOCl is isomorphic with LaOCl, PrOCl, BiOCl and NdOCl.

$PuCl_3.6H_2O$ is blue and the anhydrous trichloride of plutonium is green, but they can be distinguished from the oxychloride by their crystal structure determined by X-ray analysis. $PuCl_3$ is hexagonal, the unit cell containing two molecules and the dimensions for the $a_1$ axis being 7.38 A. and the $a_3$ axis 4.23 A. from which the density is calculated to be 5.70. The X-ray diffraction pattern for anhydrous $PuCl_3$ is distinct from that shown by the monohydrate or the hexahydrate. The hexahydrates of both $PuCl_3$ and $PuBr_3$ are isomorphic with $NdCl_3.6H_2O$.

EXAMPLE II

$PuBr_3$ and PuOBr

Hydrated plutonium oxide $PuO_2.xH_2O$ is placed in a platinum microcrucible within a quartz reaction tube and reacted at 700–800° C. with a vapor having the composition 700 mm. $H_2$, 27 mm. HBr and 1.9 mm. $H_2O$. The finely divided $PuO_2.xH_2O$ obtained by vacuum-drying plutonium peroxide or plutonium (IV) hydroxide at 70° C. or oxide produced by decomposition of the oxalate is preferred to the ignited $PuO_2$. Analysis of the mixture produced by this reaction showed that about 95% $PuBr_3$ and about 5% PuOBr were formed.

As an example of one embodiment of the "wet" method, a mixture of plutonium tribromide and plutonium oxybromide is obtained by adding a six-fold excess of $NH_4Br$ to a solution of Pu(III) or Pu(IV) which is then evaporated to dryness in a stream of HBr at 10–15 mm. pressure. During this reaction the temperature did not exceed 350° C.

PuOBr is a deep-green crystalline compound insoluble in water but soluble in dilute acids; the crystal form is tetragonal, the $a_1$ axis is 4.01 A. and the $a_3$ axis is 7.56 A. from which X-ray diffraction data the density is calculated as 9.07. By chemical analysis the atomic ratio Br:Pu has been determined as 0.94.

$PuBr_3$ is blue-green and hydrates at 30–40% relative humidity to the blue hexahydrate form. The Br:Pu atomic ratio of anhydrous $PuBr_3$ as determined by chemical analysis is 2.99. X-ray diffraction shows that anhydrous $PuBr_3$ is orthorhombic having four molecules per unit cell; the $a_1$ axis is 12.6 A., the $a_2$ axis is 4.11 A., and the $a_3$ axis is 9.13 A. from which the density is calculated as 6.69.

$PuBr_3$ hydrolyzes in the presence of $H_2O$ to form PuOBr when heated to 400° C. in a quartz reaction tube.

EXAMPLE III

$PuI_3$ and PuOI

A hydrogen-hydrogen iodide mixture composed of about 60% to 80% hydrogen iodide was obtained by reacting hydrogen with iodine at 450° C. in the presence of platinized asbestos catalyst. The gaseous mixture was passed over a sample of $PuO_2.xH_2O$ in a platinum crucible inside a quartz tube. This reaction was carried out at about 750° C. for several hours. The resultant product was a green powder which is identified by X-ray diffraction as PuOI.

In the "wet" method for the preparation of a mixture of plutonium triiodide and plutonium oxyiodide, a plutonium (III) solution containing ammonium iodide is contacted with a stream of hydrogen iodide. Subsequent to its evaporation this product mixture is heated slowly to about 300° C. in the presence of a stream of hydrogen iodide in order to sublime away the ammonium salt.

X-ray analysis shows the plutonium oxyiodide crystal form is tetragonal, the $a_1$ axis is 4.03 A. and the $a_3$ axis is 9.15 A. The calculated density for PuOI is 8.46.

Plutonium oxyiodide is difficultly soluble in water but readily dissolves in dilute sulfuric acid. Chemical analysis of this compound shows the atomic ratio for I:Pu is 0.92.

The $PuI_3$ is also green, the crystal form is orthorhombic and the constants for the $a_1$, $a_2$ and $a_3$ axis are 13.9, 4.29 and 9.90, respectively the calculated density is 6.92. Chemical analysis of plutonium triiodide shows an atomic ratio for I:Pu=2.37.

EXAMPLE IV $PuF_3$ and PuOF

Hydrogen fluoride containing hydrogen is passed over plutonium dioxide held in a platinum boat inside a nickel reactor at a temperature in the vininity of 550° C. to form a mixture of $PuF_3$ and PuOF.

$PuF_3$ is a violet-black compound crystallizing in the hexagonal form with two molecules per unit cell as shown by X-ray analysis. The lattice constants are $a_1$ 4.08 A.; $a_3$ 7.24 A. with a calculated density of 9.32. $PuF_3$ hydrolyzes in the presence of water at a temperature as low as 70° C. to form PuOF.

PuOF exhibits a face-centered cubic crystal form having four molecules per unit cell with a lattice constant of 5.70 which is in accordance with the fluoride structure attributed to LaOF 5.76 A. The calculated density for PuOF is 9.76. The oxyfluoride of plutonium has a metallic appearance and the atomic ratio as determined by chemical analysis is F:Pu=1.2.

While the invention set forth in this specification has been illustrated by examples in which plutonium dioxide is used, it will be understood that other plutonium compounds which are suitable for conversion to plutonium halide and plutonium oxyhalide may also comprise the anhydrous or the hydrated plutonium oxides, plutonium hydroxides, plutonium oxalates, or plutonium nitrates, or mixtures thereof, since these latter-named compounds are readily converted by heating to plutonium oxide.

Those skilled in the art will readily see that the reactions set forth in the above examples may be successfully carried out under varying conditions without departing from the spirit of this invention as set forth in the foregoing specification and in the following claims.

What is claimed is:

1. A process for the preparation of a material containing plutonium selected from the group consisting of the plutonium trihalides, plutonium (III) oxyhalides and mixtures thereof comprising reacting plutonium dioxide at from 300 to 1000° C. with a hydrogen halide, in the presence of a reducing agent selected from the group consisting of hydrogen, ammonium iodide and ammonium bromide.

2. A process for the preparation of plutonium trihalide and plutonium oxyhalide, comprising contacting plutonium dioxide with hydrogen and hydrogen halide at a temperature of from 300 to 1000° C.

3. A process for the preparation of a mixture of plutonium trichloride and plutonium oxychloride comprising contacting plutonium dioxide with hydrogen and hydrogen chloride at a temperature between 500° C. and 1000° C.

4. A process for the preparation of a mixture of plutonium tribromide and plutonium oxybromide comprising contacting plutonium dioxide with hydrogen bromide and hydrogen at a temperature of from 300 to 1000° C.

5. A process for the preparation of a mixture of plutonium trifluoride and plutonium oxyfluoride comprising contacting plutonium dioxide with hydrogen fluoride and hydrogen at a temperature substantially between 500° and 650° C.

6. A process of preparing plutonium trihalide comprising reacting at from 300 to 1000° C. plutonium dioxide with a hydrogen halide in the presence of hydrogen and water.

7. The process of claim 6 wherein the hydrogen halide is hydrogen chloride.

8. The process of claim 6 wherein the hydrogen halide is hydrogen bromide.

9. The process of claim 6 wherein the hydrogen halide is hydrogen fluoride.

10. A process for the preparation of plutonium trihalide comprising reacting plutonium dioxide at from 300 to 1000° C., in the presence of a reducing agent selected from the group consisting of hydrogen, ammonium iodide and ammonium bromide with hydrogen halide and removing the water as formed.

11. A process as set forth in claim 10 in which the hydrogen halide is hydrogen chloride.

12. A process as set forth in claim 10 in which the hydrogen halide is hydrogen fluoride.

13. A process as set forth in claim 10 in which the hydrogen halide is hydrogen bromide.

References Cited in the file of this patent

UNITED STATES PATENTS

| | | |
|---|---|---|
| 2,868,620 | Garner | Jan. 13, 1959 |
| 2,875,025 | Garner | Feb. 24, 1959 |

OTHER REFERENCES

Seaborg et al.: "Transuranium Elements," vol. IV-14B (1949), pages 740–744, which report the following AEC documents: Brody, CK–1701 (June 1, 1944), pages 4, 5; Katz, CK–1763 (July 1, 1944), page 7; Abraham and Davidson, CN–2689 (Feb. 15, 1945), pages 15–21; Hyde and Davidson, CK–1512 (Apr. 1, 1944), page 7; Bluestein and Garner, LA–116 (July 28, 1944); and pages 960, 963 which report the following document: Sheft and Davidson, CN–2159 (Oct. 1, 1944), page 10.

Roscoe et al.: "Treatise on Chemistry," vol. 1, page 211 (1911); MacMillan & Co., London.

Friend: "Textbook of Inorganic Chemistry," vol. 7, part 3, pages 293–296 (1926); Charles Griffin & Co., London.

Mellor: "Comprehensive Treatise of Inorganic and Theoretical Chemistry," vol. 12, pages 80, 85, 92 (1932); Longmans, Green & Co., London.

Seaborg: "Chemical and Engineering News," vol. 23, pages 2190–2193 (1945).